United States Patent
Kranz et al.

(10) Patent No.: US 7,267,005 B1
(45) Date of Patent: Sep. 11, 2007

(54) SOI-MEMS GYROSCOPE HAVING THREE-FOLD SYMMETRY

(75) Inventors: Michael S. Kranz, Madison, AL (US); Sherrie Burgett Holt, Grant, AL (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 190 days.

(21) Appl. No.: 11/070,510

(22) Filed: Mar. 2, 2005

(51) Int. Cl.
*G01P 9/04* (2006.01)

(52) U.S. Cl. .................... 73/504.14; 73/504.12
(58) Field of Classification Search ............ 73/504.12, 73/504.14
See application file for complete search history.

(56) References Cited

U.S. PATENT DOCUMENTS

| | | | |
|---|---|---|---|
| 5,728,936 A * | 3/1998 | Lutz ...................... | 73/504.14 |
| 6,067,858 A | 5/2000 | Clark et al. | |
| 6,497,147 B2 * | 12/2002 | Kato et al. ............... | 73/504.12 |
| 6,539,801 B1 | 4/2003 | Gutierrez | |

OTHER PUBLICATIONS

M. Kranz et al., "A Single Layer Silicon-On-Insulator MEMS Gyroscope for Wide Dynamic Range and Harsh Environment Applications," SPIE, 4559, pp. 5-16, Oct. 2001.
M. Kranz, S. Burgett et al., "A Wide Dynamic Range Silicon-On-Insulator MEMS Gyroscope with Digital Force Feedback", Proc. of Transducers '03, Jun. 2003, 1D4.1.

* cited by examiner

Primary Examiner—John E. Chapman
(74) Attorney, Agent, or Firm—Michael K. Gray

(57) ABSTRACT

A SOI-MEMS gyroscope has a three fold symmetrical construction such that is symmetrical in the x direction, the y direction and diagonally. The gyroscope is suspended above a silicon substrate by lateral flexures that are located at the corners of the proof mass and by central flexures that are positioned at the center regions of the proof mass. The proof mass, lateral flexures, and central flexures are formed of a silicon composition with the flexures supporting the proof mass such that the proof mass will not touch the underlying base silicon substrate even when subjected to extreme G forces. Comb finger actuators apply an electrostatic force to the proof mass in the x direction; and, when experiencing an external rotational rate around the z-axis, the Coriolis force acts along the y direction and the resulting deflection is sensed by a pair of comb-finger capacitors connected as a differential capacitive voltage divider.

28 Claims, 8 Drawing Sheets

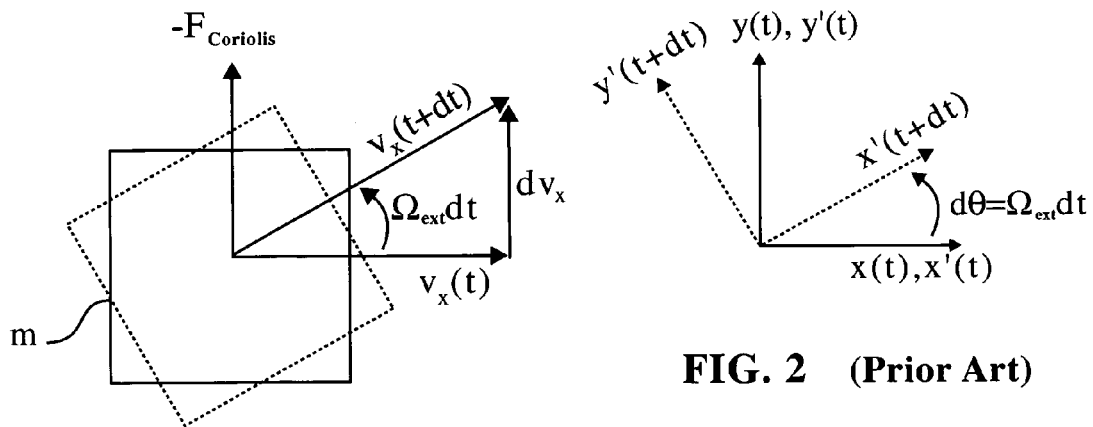
FIG. 1 (Prior Art)
FIG. 2 (Prior Art)
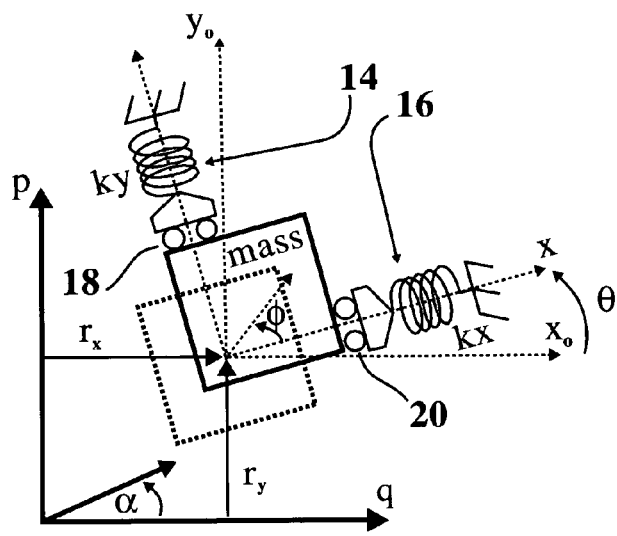
FIG. 3 (Prior Art)

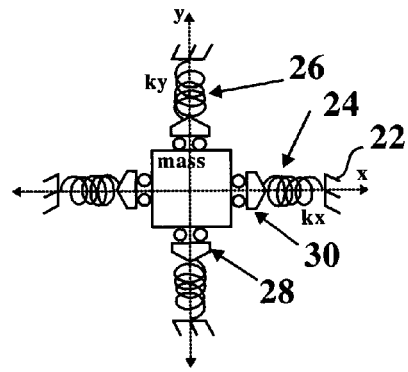
FIG. 4
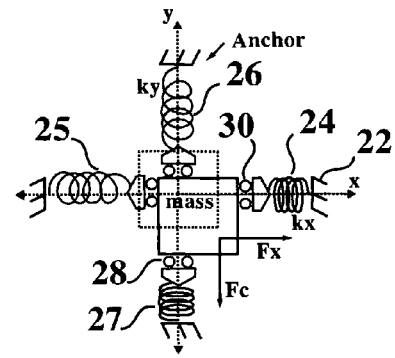
FIG. 6
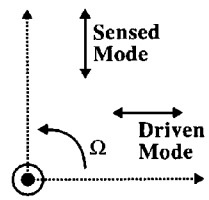
FIG. 5
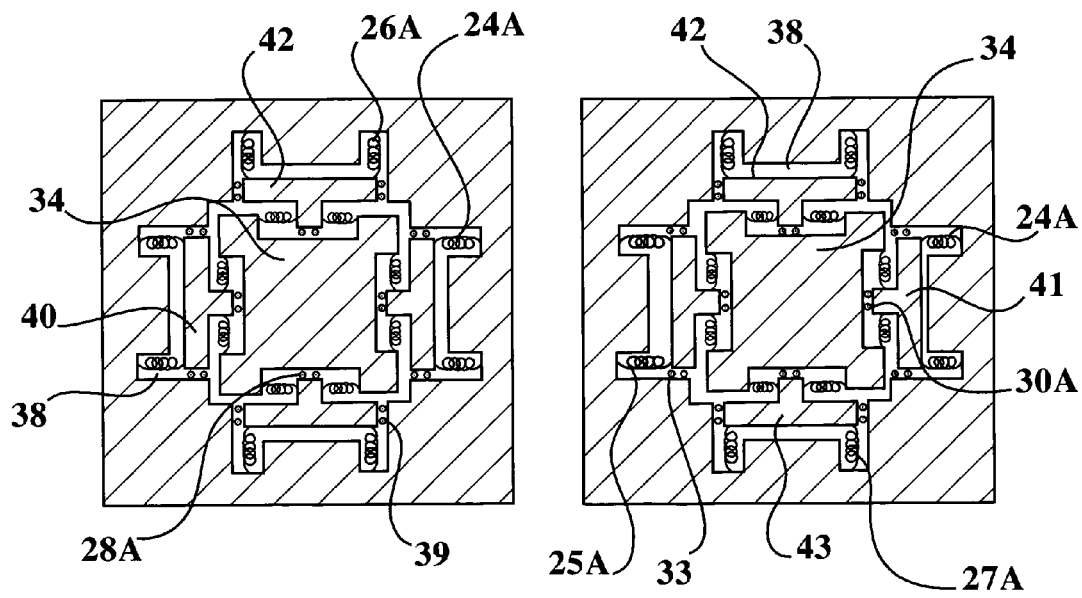
FIG. 7          FIG. 8

SOI-MEMS GYROSCOPE HAVING THREE-FOLD SYMMETRY

DEDICATORY CLAUSE

The invention described herein may be manufactured, used and licensed by of for the U.S. Government for governmental purposes without payment of any royalties thereon.

BACKGROUND OF THE INVENTION

I. Field of the invention

The present invention relates to gyroscopes.

More particularly, the present invention incorporates a stationary three-fold symmetric vibratory rate gyroscope implementation provided on a thick-film silicon-on-insulator (SOI), micro electro-mechanical system (MEMS).

II. Discussion of the Background

Small, affordable, and reliable inertial components are required for small diameter precision-guided military weapon systems. Gyroscopes are inertial components or devices that can sense angular rotation and/or rotation rate. The ring laser and interferometric fiber optic gyroscopes dominate the current tactical missile system market. Although these gyroscope technologies meet most inertial requirements, they tend to be moderately expensive. Recent advancements in microelectromechanical systems (MEMS) technologies make it possible to develop miniaturized, low cost angular rate sensors. The process technologies initially developed for fabricating integrated circuits have now evolved to allow development of MEMS devices.

Although many organizations are developing MEMS gyroscopes for a variety of applications, most do not begin to address the demanding and challenging requirements for military combat systems. Requirements for small precision guided weapons were the basis for the MEMS gyroscope development criteria. Rate sensing in many small diameter missile guidance units typically requires a rate resolution of 10°/hr. Additionally, for a particular guided munition, a large roll rate about its longitudinal axis may be experienced during flight. The anticipated rotational rates encompass a range of −3000° to +3000°/sec, resulting in a dynamic range of $10^7$.

In order to control the heading of this system during flight, the system must know its roll angle about the longitudinal axis so that the control systems can adjust accordingly. Therefore, the accuracy of this angular measurement must correspond to a bias stability of 10°/hr in order for the guidance system to compensate.

Furthermore, actuators in the control system of the guided munition may result in a substantial vibration environment. Large shocks of greater than 1000 G's can be seen at frequencies ranging from 5 kHz to 15 kHz. Additionally, the inertial device must operate through military temperature environments (−55° to +125°). The criteria for achieving superior resolution while measuring large rotation rate adds difficulty to design determination since there are tradeoffs that exist in determining the mechanical structure's topology.

For example, achieving superior resolution requires substantial inertial mass available in the device. However, when a large mass design is devised, the resulting deflections due to large values of rotational rate are generally more than the device can accommodate. In most cases, enough electrostatic feedback force cannot be produced to counter the Coriolis forces. Given that the MEMS gyroscope must not only survive but operate through these harsh environments, the challenge has been to develop a robust, accurate and reliable MEMS gyroscope.

MEMS angular rate sensors or gyroscopes that detect angular rate utilize the Coriolis Effect. A vibratory rate gyroscope is a sensor that detects and measures rotation by generating and measuring Coriolis acceleration. In other words, the sensing method used in a vibratory rate gyroscope is based on the Coriolis pseudo-force resulting from a translating body in a rotating frame of reference. The conventional illustrations of FIG. 1 and FIG. 2 demonstrate the Coriolis Effect on an object.

A mass, m, is moving at time, t, with a velocity $v_x$ along both the (x,y) and (x',y') axes.

At time t+dt, the (x',y') axes have rotated Ωdt where Ω is the rotational rate. In accordance with Newton's Laws, the mass is still moving with velocity $v_x$ in the (x,y) frame of reference.

However, in the (x',y') frame of reference, is appears that the velocity, $v_x$ has moved by an amount $dv_x$. Therefore the Coriolis acceleration and force is:

$$\alpha = \frac{dv}{dt} = -2\Omega v_x \qquad \text{Equation (1)}$$

$$F = ma = -2m\Omega v_x \qquad \text{Equation (2)}$$

The fundamental result from this simple derivation of system dynamics is that a translating mass in a rotational frame of reference will appear to experience, within the rotating frame, a force orthogonal to its velocity and proportional to its velocity and the rate of rotation of that frame of reference.

The conventional vibratory rate gyroscope consists of a mass-spring system that has at least two orthogonal modes of oscillation (FIG. 3). The mass is forced to have an oscillatory velocity in the frame of reference of the device along the x-axis. Anchored springs 16 and 14 having respective identical spring constants $k_x$ and $k_y$ are attached to respective rollers 20 and 18 so as to provide a suspension that constrains the mass to particular orthogonal oscillation modes. When the device experiences rotation, the Coriolis force induces oscillation of the orthogonal mode of the device. Sensors detect this motion and provide a signal from which the rotational rate is extracted. The Coriolis force is proportional to the external rotation rate.

The equations of motion for a mass-spring system moving in a non-inertial reference frame are found using Lagrangian dynamics. Expressions for the potential energy and kinetic energy of the system must be derived first.

The global frame of reference is the p-q-a frame, the local frame of reference x-y-φ is rotated by an angle θ with respect to the global frame. The local frame is also translated by $r_x$ and $r_y$ with respect to the global frame.

The potential energy stored in the springs is:

$$PE = \frac{1}{2}k_x x^2 + \frac{1}{2}k_y y^2 + \frac{1}{2}k_\phi \phi^2 \qquad \text{Equation (3)}$$

The kinetic energy is calculated in the global frame of reference, using the global variables:

$$KE = \frac{1}{2}m\left(\frac{dq}{dt}\right)^2 = \frac{1}{2}m\left(\frac{dp}{dt}\right)^2 + \frac{1}{2}I\left(\frac{d\alpha}{dt}\right)^2 \quad \text{Equation (4)}$$

The global variables are related to variables in the local frame of reference by rotation matrices:

$q(t)=\cos(\theta)x(t)-\sin(\theta)y(t)+r_x(t)$     Equation (5)

$p(t)=\sin(\theta)x(t)+\cos(\theta)y(t)+r_y(t)$     Equation (6)

$a(t)=\theta(t)+\phi(t)$     Equation (7)

The equations of motion in the local frame of reference are found from $$F_{x_i} = \frac{\partial L}{\partial x_i} - \frac{d}{dt}\frac{\partial L}{\partial \dot{x}_i} \quad \text{Equation (8)}$$

Where $x_i$ are generalized coordinates, $F_x$, are external forces such as damping and excitation forces, and L is the Lagrangian (L=KE−PE).

The global coordinates in the kinetic energy relation are substituted by Equations (5), (6) and (7) to convert to local coordinates. Equation (8) is then applied for each of the on-chip coordinates (x, y, φ), by replacing the generalized coordinate by the respective on-chip coordinate, yielding:

$$\ddot{x} = -\omega_x^2 x - \frac{\omega_x}{Q}\dot{x} - \frac{F_x}{m} + x\Omega^2 + y\dot{\Omega} + 2\Omega\dot{y} - a_x\cos\theta - a_y\sin\theta \quad \text{Equation (9)}$$

$$\ddot{y} = -\omega_y^2 y - \frac{\omega_y}{Q}\dot{y} - 2\Omega\dot{x} + y\Omega^2 - x\dot{\Omega} + a_x\sin\theta - a_y\cos\theta \quad \text{Equation (10)}$$

$$I\ddot{\phi} = -k_\phi\phi - I\dot{\phi} \quad \text{Equation (11)}$$

Where $w_x^2=k_x/m$ and $w_y^2=ky/m$ are the resonant frequencies of the x and y modes, respectively, $a_x$ and $a_y$ are external accelerations, and Q is the quality factor of resonance. The Coriolis accelerations are the $2\Omega\dot{y}$ and $2\Omega\dot{x}$ terms. The last two terms in Equations (9) and (10) are the acceleration terms, which create transients at the natural frequency of the system. The terms $y\dot{\Omega}$ and $x\dot{\Omega}$ refer to the inertia of angular acceleration. The terms $y\Omega^2$ and $x\Omega^2$ are centripetal accelerations, and act as spring softeners.

The importance of the above derivation is that it includes extra terms in the equations of motion beyond the standard Coriolis force terms. When experiencing large rotational rates and angular accelerations, these extra terms, the centripetal acceleration, linear acceleration and angular accelerations, play larger roles in the error terms of the rotational rate signal.

In addition, the derivation shows, as is commonly known, the role of matching resonant frequencies so that the benefits of a high quality factor can be applied to the sensor.

The coefficients in the above equations, particularly the spring constant and quality factor, are dependent on temperature. In prior art systems, the temperature sensors are prone to sense temperatures at variance from the actual temperature of the gyroscope. Such a result causes errors in the rotational calculations.

In micro-electronic designs, the proof mass of the gyrroscope is positioned and moves above a base substrate surface. Even when experiencing high G forces, the proof mass must remain above the substrate surface.

SUMMARY OF THE INVENTION

Accordingly, one object of the invention is to provide a gyroscope having a temperature sensor that accurately conveys the actual temperature experienced by the gyroscope.

Another object of the invention is to provide a gyroscope that has a proof mass support structure that prevents the proof mass from touching the base substrate even when subjected to high G forces so as to prevent failure of the device.

Still another object of the present invention is to provide a SOI-MEMS gyroscope having a superior dynamic range capability.

Yet another object is to provide a SOI-MEMS gyroscope that is economical to manufacture.

These objects are provided by a SOI-MEMS gyroscope having a proof mass that is suspended over a base substrate surface by a three-fold suspension that prevents the proof mass from touching the base substrate surface even when exposed to 10,000 G's of force. The symmetry is three fold in that the device is symmetric along the x and y axes and along its diagonal.

Then x-axis oriented actuators are excited in one mode, rotations of the device about the z-axis result in oscillations in the orthogonal mode that are detected by y-axis oriented sensors. The mode-decoupled suspension allows only one degree of in-plane freedom for each excitation actuator, thereby attenuating errors due to oscillation axis misalignment.

In addition, suspension symmetry maintains matched oscillation mode frequencies through process and temperature variations, allowing maximized dynamic range in a wide dynamic range discrete-time control loop.

The three-fold symmetric gyroscope implementation inherently matches the resonant frequencies in both oscillation modes by using completely symmetric suspension, thereby increasing the sensitivity of the device by using the Q-factor to maximize displacements for a given force. Also, the symmetry reduces the effects of process variations on the device sensitivity. In practical implementation of the vibratory rate gyroscope, the designed Q value is constrained by the necessary bandwidth of the input rotation.

The scale factor of the device is highly dependent on the matching of the resonant frequencies, since Q is an important gain. If the frequencies are not matched, only a fraction of the Q will be seen as gain. Through time and temperature variations, changes in the modes of the SOI based MEMS vibratory rate gyroscope should match so as to prevent the scale factor from drifting.

The suspension of the present invention utilizes a folded-beam concept (the multiple strips of the present invention can be viewed as folded beams of the flexure system). Folded flexures exhibit much less nonlinearity than a single straight flexure. A one-piece straight beam when deflected orthogonal to the longitudinal axis, will experience stretching along that axis. This stretching increases the actual spring constant and adds nonlinear terms.

By contrast, in the folded flexure suspension of the present invention, both the anchor holding the strips in place, and the force applied to the strips or flexure are colinear. As the strips flex, there is no stretching thereby allowing larger linear displacements. In total, folded flexures (the multiple strips of the present invention) provide for increased linear response, reduced angular moments, and decreased cross-talk over the entire dynamic range.

Even with the three-fold symmetric gyroscope configuration, induced drifts occur as a result of the silicon material being exposed to extreme temperatures. Accordingly, these temperature drifts are remedied by accurate measurements of chip temperature that is conveyed in real time to control electronics.

The accurate measurement of chip temperature is provided by an array of resistor elements that comprise a temperature sensor that is positioned next to the gyroscope and on the same chip substrate. This allows the gyroscope and temperature sensor to be made during the same manufacturing process.

DESCRIPTION OF THE DRAWINGS

A more complete appreciation of the drawings and many of the attendant advantages thereof will be readily obtained as the same becomes better understood by reference to the following detailed description when considered in connection with the following drawings, wherein:

FIG. 1 and FIG. 2 are prior art graphical illustrations of a mass experiencing a corriolis force;

FIG. 3 is a prior art graphical illustration of a mass-spring system having two orthogonal modes of oscillation;

FIG. 4 is a conceptual mass-spring system of a proof mass at rest;

FIG. 5 is a graphic demonstrating the direction of the sensed mode and driven mode for FIGS. 4, 6, 7 and 8.

FIG. 6 is the conceptual mass-spring system of FIG. 5 in a driven mode;

FIG. 7 is a conceptual SOI-MEMS multiple mass-spring system at rest that is analogous to FIG. 4;

FIG. 8 is a conceptual SOI-MEMS mass-spring system in a driven mode that is analogous to FIG. 6.

DETAILED DESCRIPTION

Figure 10:
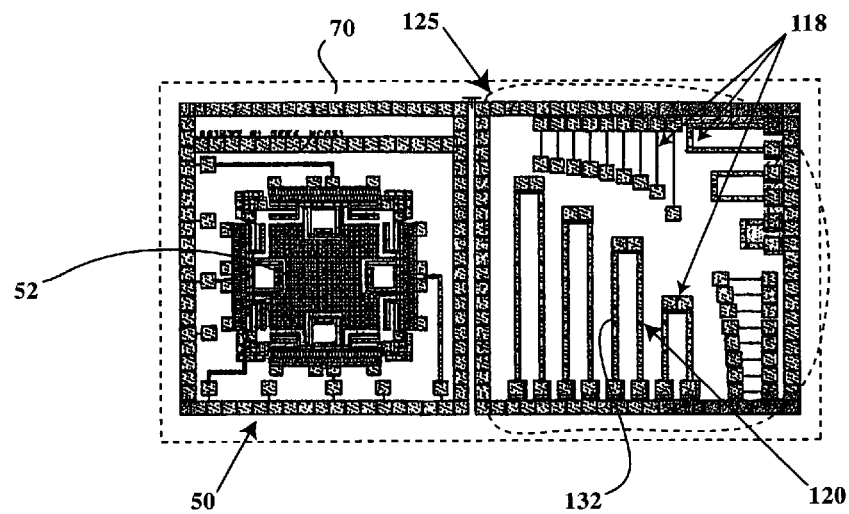
FIG. 10 is a top view of the single-substrate gyroscope and temperature sensor according to the present invention.

In a vibratory gyroscope, the two fundamental modes of oscillation are along the x-axis, the driven mode, and along the y-axis, the sensed mode (FIG 5).

A conceptual suspension, shown in schematic form in FIG. 4, approximates a set of identical springs 26, 24 placed symmetrically about a central mass. The springs 26, 24 are connected to respective rolling pins 28 and 30 that allow the mass to move and slide in the y and x directions.

In FIG. 6, the actual deflection of the mass in x and y is shown. The rolling pins 28, 30 constrain the springs to act along the x-axis or the y-axis, only. In that the mass of FIG. 6 has moved to the right and downward from its position in FIG. 4, the spring 24 is compressed against anchor 22. Spring 27 is likewise compressed from the mass' movement in the y direction while springs 26 and 25 are stretched. FIGS. 4 and 6 demonstrate that the restoring forces on the mass are always orthogonal and in line with the x- and y-axes.

In an analysis of the conceptual schematic of FIG. 6, , $F_x$ represents the forcing function. If the forcing function, $F_x$, is at the resonant frequency of the driven mode, then the displacement of the proof mass is maximized, with a gain Q over the static displacement. The frequency of the Coriolis force $F_c$ is equal to the resonant frequency of the driven mode, with amplitude modulated by both maximum displacement of the mass x and the rate of external rotation.

The velocity of the excited mode, the size of the mass, and the external rotation rate determine the magnitude of the Coriolis force. If the resonant frequency of the sensed mode is equal to that of the driven mode, the maximum displacement for a given rotational rate will occur in the sensed mode.

In development of the present invention, the concept depicted in FIGS. 4 and 6 was taken to formulate a conceptualization of a SOI-based MEMS vibratory rate gyroscope chip (FIGS. 7 and 8).

In FIGS. 7 and 8, the central proof mass 34 is surrounded by a symmetric suspension having identical springs sets 24A, 25A, 26A, 27A, 37, 39 along both the x and y modes. The comb-finger actuators 40, 41 apply an electrostatic force to the proof mass in the x-direction thereby exciting the driven mode so as to allow the proof mass to move above the base substrate surface 38. The comb-finger actuators 40 and 41 are provided with rollers 33.

When experiencing an external rotation rate, the Coriolis force acts along y and has a frequency equal to that of excitation frequency. The Q-factor of the system provides a gain in the displacement of the sensed mode. The y deflection is sensed with a pair of comb-finger capacitors 42, 43 that are connected as a differential capacitive voltage divider. The comb-finger capacitors 42, 43 are provided with rollers 33.

The spring 26A in FIG. 7 may be thought as being analogous to the spring 26 of FIG. 4. Likewise compressed spring 24A of FIG. 8 may be thought as being analogous to compressed spring 24 of FIG. 6. As the proof mass 34 moves from its position in FIG. 7 to the position of FIG. 8, springs are compressed and stretched in similar fashion to those of FIG. 6.

The suspension of the conceptualized MEMS vibratory rate gyroscope of FIGS. 7 and 8 is three fold symmetric. By "three fold symmetric", it is meant that there is symmetry along y, along x and along the device diagonal.

The suspension serves two purposes. First, the driven and sensed modes of the device displace different, but identical, spring sets; one set displaces in x and one set displaces in y. Spring constants as well as moving mass are matched along both the excitation and sense modes.

Therefore, both oscillation modes have equal resonant frequencies. The modes will theoretically match even if a uniform process variation occurs, e.g., over-etching of the proof mass. This matching will remain through time and temperature variations.

The second purpose of the suspension is to decouple, mechanically, the x and y deflections of the actuators and sensors. The suspension allows motion of the central mass in both x and y using complete springs that are very stiff in one direction and very compliant in the other. The masses that attach to the actuators and sensors are placed in the suspension in such a way that they can only move along one axis. Thus, a deflection of the proof mass 34 in x will not affect the sensor mass (comb-sensor 42) which only moves in y. Therefore, the spring network reduces the mechanical crosstalk between the sensors and actuators.

The suspension is made up of simple folded beam springs. In both the x and y directions, there is a total of 6 springs per direction, resulting in a total spring constant for each mode of:

$$k_x = \frac{6Eh w_x^3}{l_x^3} \quad k_y = \frac{6Eh w_y^3}{l_y^3}$$

, where h is the thickness of the beam, $w_x$ and $w_y$ are widths of the beams along x and the beams along y, respectively, and $l_x$ and $l_y$ are the lengths of the beams along x and beams along y, respectively.

The comb-drive actuators in the device can produce a force, $F_d$, and a displacement in the excited mode, $x_e$, of:

$$F_d = \frac{1.14 N \varepsilon_o h V^2}{g_o}$$

$$|x_e| = \frac{Q F_d}{k_x}$$

, where $g_o$ is the gap between fingers of the comb-drive, N is the number of fingers, h is the thickness of the fingers, and V is the voltage across the actuator. The factor of 1.14 accounts for nonideality of the actuator due to fringing fields.

The resonant frequency of the sensed mode (and hence the driven mode) is:

$$\omega_{ry} = \sqrt{\frac{k_y}{m}} = \omega_{rx}$$

One can predict the magnitude of the sensed displacement, y, given the mass, m, the modes resonant frequency, $w_{ry}$, the external rotation rate, $\Omega$, the Q-factor of resonance, and the spring constants. That mechanical sensitivity is then $$\left|\frac{y}{\Omega}\right| = \frac{2mQ^2 \omega_r F_d}{k_x k_y}$$

Brownian noise will place a limit on the resolution of the device. This noise can be estimated with the following equation [14]

$$\overline{F_n^2} = \frac{4kT\omega_r \Delta f}{Q}$$

, which will represent a noise in the rotational rate signal of [3]

$$\Omega_n = \sqrt{\frac{kT \Delta f}{mQ\omega_r x^2}}$$

These equations can be used to size the gyro geometries for specific rate ranges, sensitivity, and resolution requirements.

Much experimentation was required to progress from the conceptual (SOI-based) MEMS vibratory rate gyroscope of FIGS. 7 and 8 to the operable device of the present invention.

Figure 9:
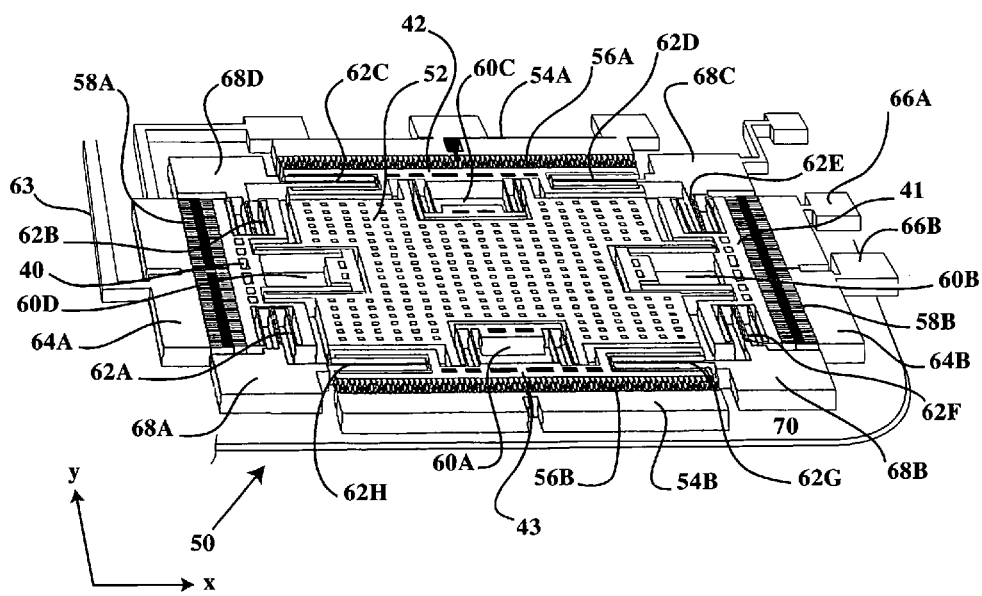
FIG. 9 is a perspective illustration of a SOI-MEMS gyroscope according to the present invention.

With reference to FIG. 9, the silicon-on-insulator-based (SOI-based) MEMS vibratory rate gyroscope 50 of the present invention is a single layer structure having a proof mass 52 that is placed in a three-fold decoupled symmetric suspension with matched fundamental oscillation modes. The suspension includes four central flexures 60A, 60B, 60C and 60D and eight lateral flexures 62A, 62B, 62C, 62D, 62E, 62F, 62G, 62H.

Lateral flexures 62A and 62H are anchored by lateral anchor 68A. Lateral flexures 62F and 62G are anchored by lateral anchor 68B. Lateral flexures 62E and 62D are anchored by lateral anchor 68C and lateral flexures 62C and 62B are anchored by lateral anchor 68D. Anchor 54B is connected to sensor 56B, and anchor 54A is connected to sensor 56A. Sensors 56A and 56B are comb-finger capacitors. Anchor or stator 64A is connected to comb-finger actuator 58A and anchor or stator 64B is connected to comb-finger actuator 58B. Electrical connection 63 connects to comb finger actuator 58A. Electrical connections connect the comb-finger actuators to bond sites such as bond sites 66A, 66B. A tansimpedance amplifier (not shown) can be utilized to detect the currents in the capacitive divider of the sensed comb-finger capacitors and the currents in the drive off-chip electronics. The detected data is provided to a CPU or controller of the missile control system.

Figure 11:
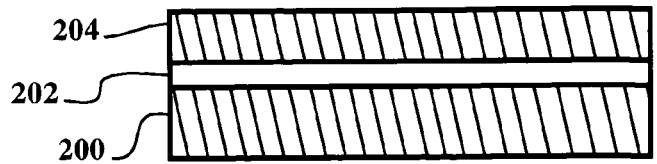
FIG. 11 is a side-view of a 100 micron silicon substrate on a 1 micron oxide SOI wafer as used in manufacturing the present invention.
Figure 12:
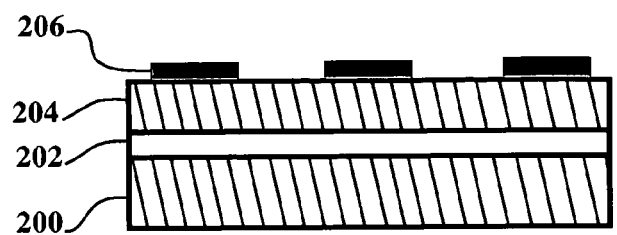
FIG. 12 is a side-view showing that the 100 micron silicon substrate layer of FIG. 11 is applied and patterned by photoresist.

The device is fabricated in a cost effective and highly controllable process for in-plane inertial sensors. In FIG. 11, the process begins with a silicon-on-insulator wafer having a 100 µm thick silicon layer 204 on top of a 2 µm or 1 µm thick oxide layer 202. A silicon base layer or standard silicon handle wafer 200 lies below oxide layer. In FIG. 12, a metal layer 206 of gold, silver or other appropriate metal is deposited and patterned to yield electrical contracts.

Figure 13:
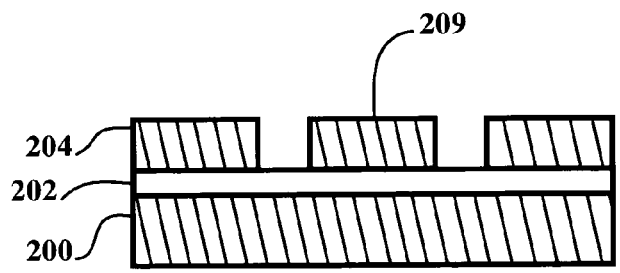
FIG. 13 is a side-view showing how the 100 micron layer of FIG. 12 is subjected to a Si reactive ion etch and strip photoresist.
Figure 14:
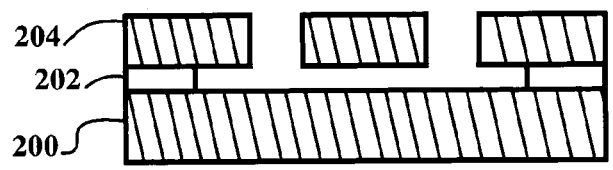
FIG. 14 is a side view showing that the 100 micron layer of FIG. 13 is subjected to an isotropic oxide etch to release microstructure.

Then, in FIG. 13 a thick photoresist mask 208 is patterned on the wafer using standard lithography. This layer protects the metal during subsequent steps, and also devises the geometries of the device structures. Thereafter, in FIG. 14, deep Silicon Reactive Ion Etching (Si RIE) is used to define the microstructure by etching away the oxide layer 202E.

Figure 15:
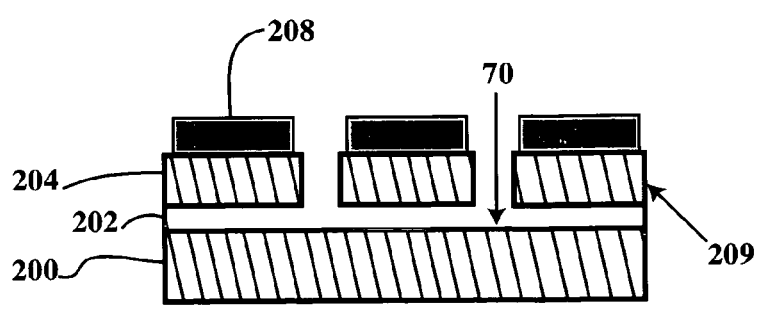
FIG. 15 is a side-view showing that 100 micron layer of FIG. 14 is selectively provided with a metal layer to provide for electrical contacts.

After the deep etch and removal of photoresist, the device undergoes a sublimation-based release process (FIG. 15) so as to release given structures 209 with a post release anti-stiction coat that reduces process induced and in-use stiction.

After release, metallization is evaporated on the surface to create electrical contacts. The mechanical structure is integrated in a vacuum-sealed hermetic package with a separate CMOS readout ASIC.

Figure 16:
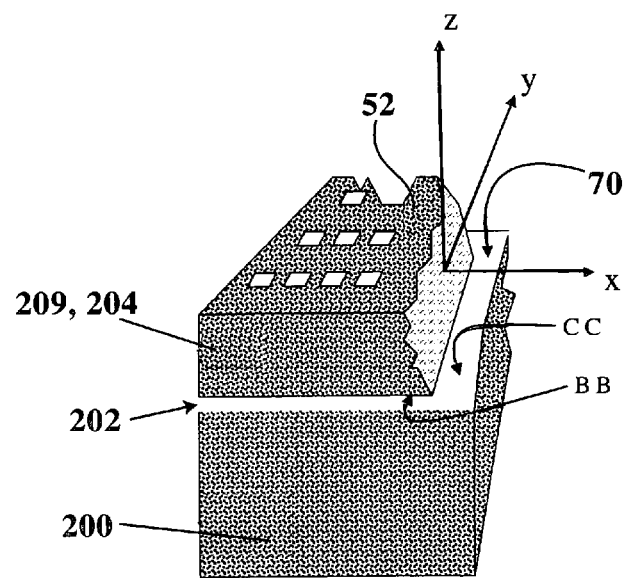
FIG. 16 is a sectional perspective view of the SOI-MEMS gyroscope of the present invention in which a 1 micron gap 70 exists between the 100 microns of silicon between points AA and BB and the silicon base substrate located between points CC and DD.

In FIG. 16, a sectional view is present to demonstrate that the proof mass 52 is suspended above the base substrate surface 70 such that the distance from BB (a point on the bottom of the proof mass 52 to CC (a point on the base substrate top surface) is 1 or 2 µm.

Figure 17:
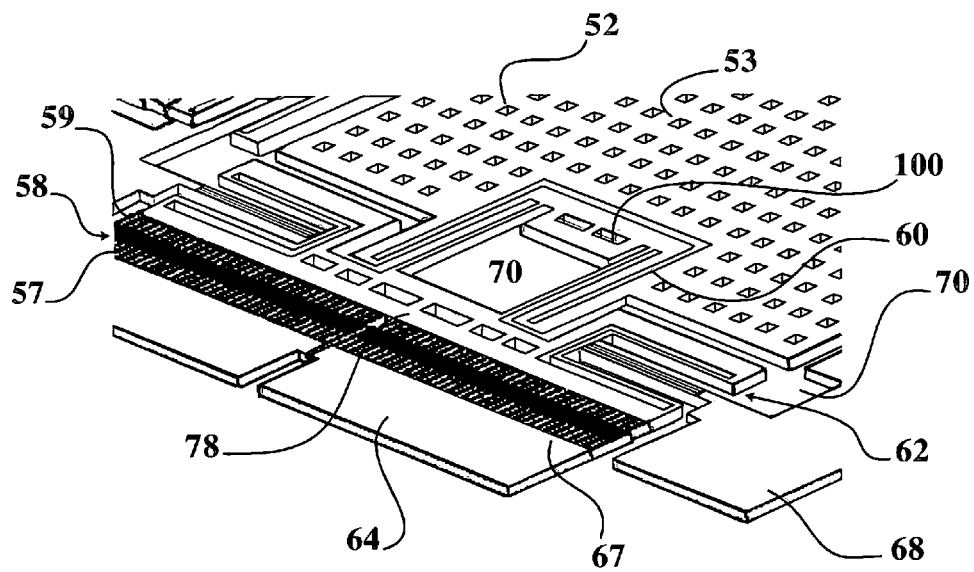
FIG. 17 is a perspective view of the gyroscope according to the present invention which demonstrates the central and lateral flexures that support the proof mass above the base substrate.

With reference to FIG. 17, the proof mass 52 is provided with holes 53 which are utilized during the fabrication process to allow chemicals to pass through to the base substrate surface 70. A lateral anchor 68 connects to a lateral flexure 62. The central flexure 60 has a strip connector or truss 100 integrally connected to four strips of the central flexure that are attached to the central part 80 of flexure support (rotor) 78. Flexure support (rotor) 78 connects to a row of fingers 59 of the comb-finger actuator 58. The fingers are cantilevered to the flexure support 78. A second row of fingers 57 is cantilevered to the anchor (stator) 64 at a front edge 67 of the anchor. In such a manner the comb-fingered actuators 58A, 58B and comb-fingered sensors 56A, 56B are positioned around the periphery of proof mass 52.

Figure 18:
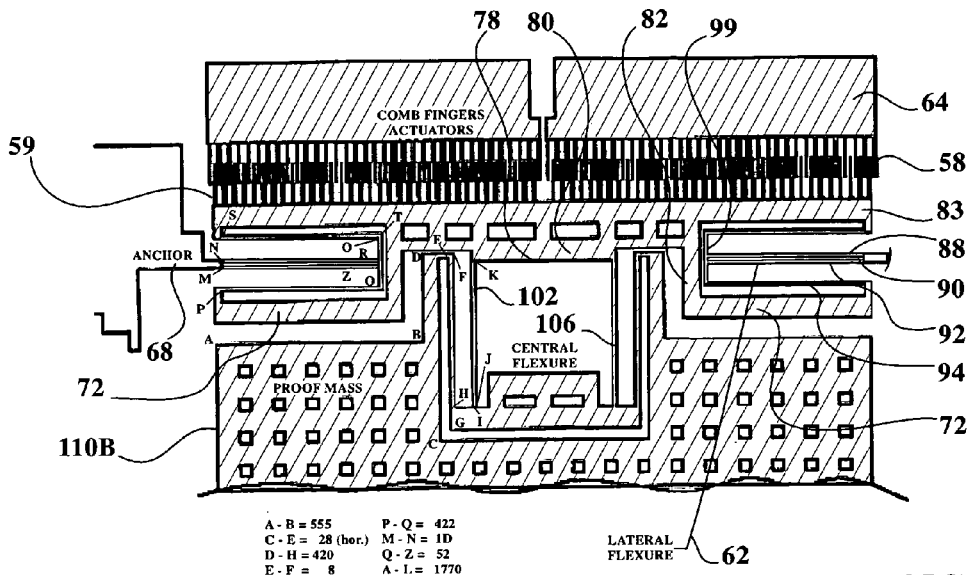
FIGS. 18 and 19 are top view of the proof mass and central and lateral flexures according to the present invention.
Figure 19:
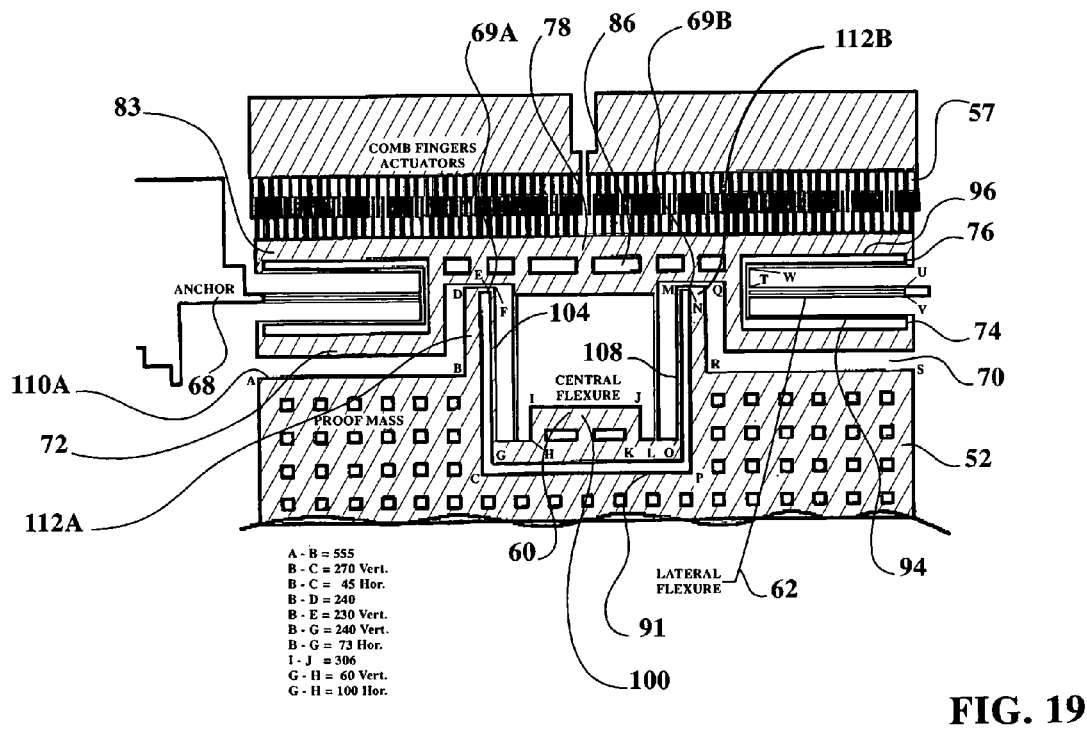

With reference to FIGS. 18 and 19, the central flexure 60 is provided with flexure strips 102 and 106 that connect flexure support (rotor) 78 to strip connector (truss) 100. Central flexure 60 further strips 104 and 108 that extend from strip connector 100 toward the flexure support 78, but do not contact flexure support 78. Instead, strips 104 and 108 connect to lateral isthmus 69A and lateral isthmus 69B, respectively. Lateral isthmus 69A connects to promontory region 112A of proof mass 52 and lateral isthmus 69B connects to promontory region 112B of proof mass 52. Strip connector 100 is positioned proximate to but does not touch the central interior border 91 of the proof mass 52. Strips 102 and 106 extend from strip connector or truss 100 to the central part 80 of flexure support 78.

The flexure support (rotor) 78 provides support for a central flexure and two lateral flexures on each side of the central flexure 60. The flexure support 78 extends laterally on both sides of its central region 80 to form lateral support regions 83. From the lateral support region 83 an isthmus strip 76 connects to strip 96.

Strips 88 and 92 are positioned in the middle region of the lateral flexure and are integrally attached to an anchor 68. A narrow channel 90 extending to the base substrate surface separates strips 88 and 92. Strip 94 is connected to strips 96, 88 and 92 by an orthogonal connector (orthogonal truss) 99 that is proximate to but does not touch a connecting region 82 which connects the central part 80 of flexure support 78 with a support arm 72. An isthmus 74 connects the support arm 72 with strip 94. Strips 96, 88, 92 and 94 are all parallel to one another.

Still with reference to FIGS. 18 and 19, the prototype gyroscope of the present invention had a proof mass that measured 1770 µm across. The side border regions 110A, 110B measured 555 µm in length. The promontory regions 112A, 112B measured some 240 µm in length and 45 µm in width. A distance of some 52 µm separated the strip 96 from strip 88 and the same 52 µm separated strip 92 from strip 94. Strips 96, 88, 92 and 94 measured about 8 µm in width and had a length of approximately 422 µm. Orthogonal connector 99 had a width of 8 µm as well. Strips 104, 102, 106 and 108 had a length of approximately 420 µm and measured 8 µm across. Strip 104 was separated from promontory 112A by a distance of 28 µm. A distance of some 30 µm separated the central interior border 91 of proof mass 52 from strip connector 100.

The strips 96, 88, 92, 94 of lateral flexures 62 and the strips 104, 102, 106 and 108 of the central flexures 60 may be viewed as forming folds with gaps lying between the respective strips. Respective gaps separate the strips 96, 88, 92, 94 from the support arm 72, connecting region 82 and lateral region 83 of flexure support 78. A gap separates the connecting region 82 of flexure support 78 from the promontory region 112 of the proof mass. A gap separates the side border 100 of the proof mass from the support arm 72 of the flexure support 78.

Figure 20:
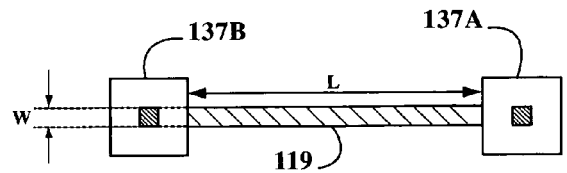
FIG. 20 is a side-view of a straight resistor element of the heat sensor according to the present invention.
Figure 22:
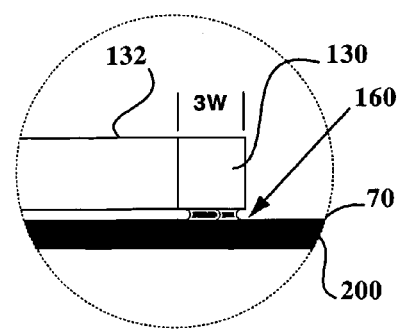
FIG. 22 is a side-view of a portion of the folded support area of the resistor element of FIG. 21.
Figure 21:
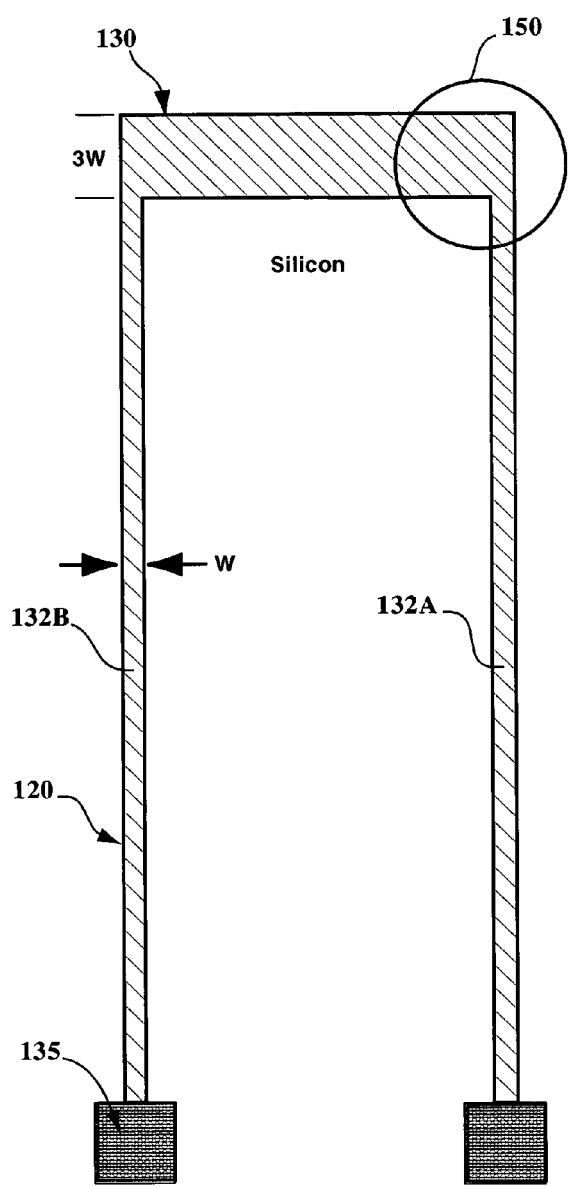
FIG. 21 is a top-view of a folded resistor element of the heat sensor according to the present invention.

With reference of FIGS. 20–22, a temperature sensor 118 is provided on the same base substrate surface as the gyroscope 50. In this manner the temperature detected by the temperature sensor will more accurately convey the actual temperature experienced by the gyroscope. Further, the temperature sensor can be formed during the same manufacturing process as the gyroscope. The temperature sensor has an array of resistors of various lengths and types.

The integrated temperature sensor in FIG. 10 includes folded silicon resistor bridges. The resistors exhibit a temperature dependent resistance. These are measured by applying a DC current level and monitoring voltage across the bridge. An array of folded bridges of various lengths and straight sensors of various lengths are provided to more accurately detect temperature in varying temperature ranges.

A folded resistor 120 of an array of resistors 125 is provided with beam regions 132A and 132B that connect at one end to an electrical contact 135. The other end 130 of the beams 132A and 132B is a folded region that is supported by an insulation layer of oxide 160 that is left behind after the etch and release step of the manufacturing process.

Figure 23:
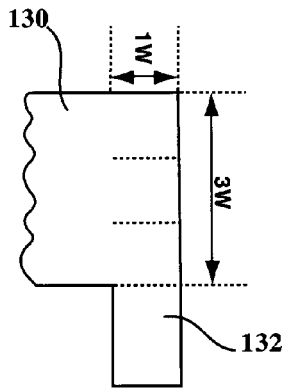
FIG. 23 is a schematic illustration of the folded support region of FIG. 21.

The side view of the region 150 of FIG. 21 is demonstrated in FIG. 22. FIG. 22 and FIG. 23 demonstrate that the folded end region is three times thicker than the support beams. This construction gives proper support and prevents the beams 132A, 132B from touching and shorting out on the underlying base substrate surface 70.

For the integrated temperature sensors, the sensitivity of the resistor bridges to temperature is an important factor. The resistivity of the starting material (p) was defined as 0.1 ohm-cm and the thickness (t) was defined to be 100 µm. Sheet resistance is defined as:

$$R_s = \frac{\rho}{t}$$

and given in units of ohms/square. The resistance of a resistor is then defined as $$R = R_s\left(\frac{L}{W}\right)$$

where L is defined as the length and W is defined as the width of the trace. Some of the integrated resistors used in the current embodiment are straight like the one depicted, but others are folded and serpentine versions.

To calculate the resistance change due to temperature the following equation is used $$R=R_0(1+a(T-T_0))$$

where a is defined to be the temperature coefficient of resistance (TCR), T is the temperature, $T_0$ and $R_0$ are the temperature and resistance references respectively.

$T_0$ is defined to be 300K. The TCR for silicon of this doping level has been experimentally measured as 2.5E-03 $K^{-1}$. In calculating the total resistance two factors must be considered (1) the resistance due to the bridge and (2) the resistance due to any corners in the layout.

For all of the folded resistor bridges, a turn is required in order to line up the bond pads with the periphery of the chip. This turn must be accounted for when calculating resistance.

To prevent accidental shorting due to long unsupported beams touching the handle of the wafer, all ends of the beams are anchored. This requires a corner configuration as shown in FIG. 23.

The integrated temperature sensors (FIG. 10) provide a real-time and accurate measurement of temperature right on the MEMS chip. This is important in maintaining gyroscope performance when exposed to extreme temperature conditions.

Figure 24:
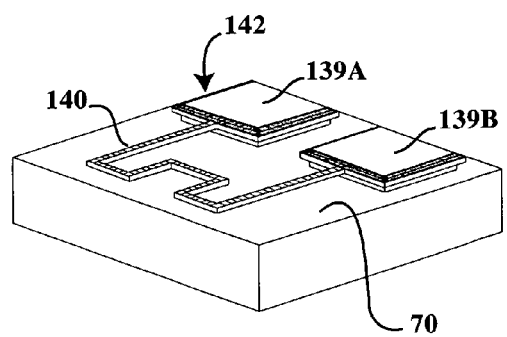
FIG. 24 is a perspective illustration of a serpentine resistor element being supported on a silicon substrate according to another embodiment of the present invention.
Figure 25:
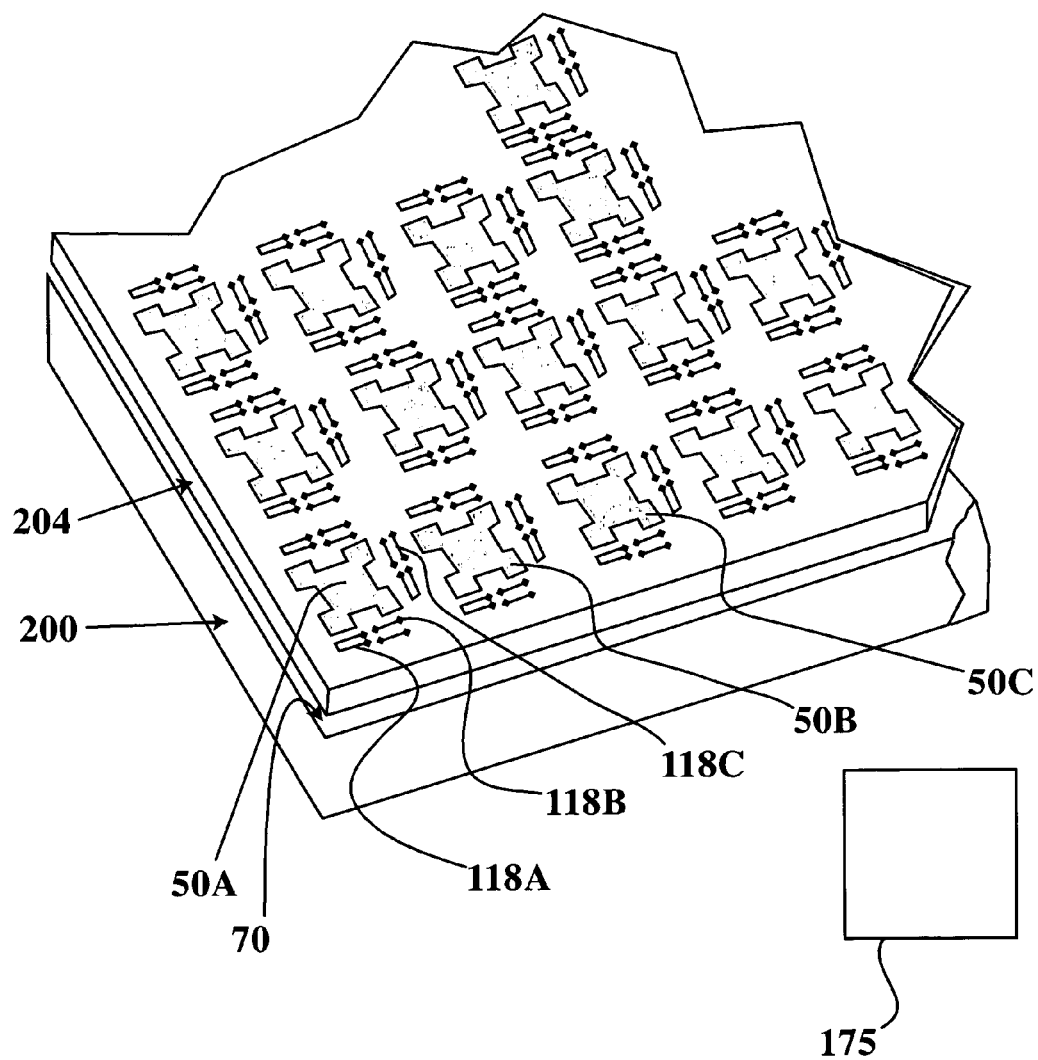
FIG. 25 is a perspective illustration of a plurality of gyroscopes and a corresponding plurality of sensor elements all arranged on a single substrate.

The array of integrated temperature sensors provide accurate temperature data and can be manufactured on the same chip and at the same time as the gyroscope components without extra processing steps or external integration thereby greatly reducing manufacturing costs. Various shapes of sensors can be utilized for meeting geometric space requirements. In FIG. 24 a serpentine resistor 142 having a serpentine beam 140 is supported by contacts 139A, 139B.

The SOI-MEMS technology utilized by the present invention allows hundreds of complementing gyroscopes 50A, 50B, 50C, etc., and temperature sensors 118A, 118B, 118C, etc. to be manufactured on the same chip with readout of information being sent to control electronics or CPU 175.

From the above description those skilled in the art will recognize that various modifications and embodiments may be made without departing from the spirit of the invention. Accordingly, the scope of the invention is to be limited only by the claims appended hereto.

What is claimed is:

1. A SOI-MEMS gyroscope, comprising:
a silicon substrate;
a proof mass;
suspension means for suspending said proof mass above said silicon substrate;
actuating means connected to said suspension means;
sensing means connected to said suspension means; and
wherein said suspension means comprises a plurality of lateral flexures and a plurality of central flexures, said central flexures being aligned with a center point of said proof mass such that said center point lies between a first pair of central flexures which are oriented to the Y axis and said center point lies between a second pair of central flexures which are oriented to the X axis.

2. A gyroscope according to claim 1, wherein:
said suspension means can suspend said proof mass above said silicon substrate even when said proof mass is subjected to 10,000 G's of force.

3. A gyroscope according to claim 1, wherein:
each lateral flexure of said plurality of lateral flexures has plurality of lateral strips.

4. A gyroscope according to claim 3, wherein each central flexure of said plurality of central flexures has a plurality of strips.

5. A gyroscope according to claim 4, wherein said plurality of lateral flexures includes two lateral strips that are separated by a narrow channel.

6. A gyroscope according to claim 5, further comprising:
an anchor directly connected to said two lateral strips that are separated by the narrow channel.

7. A gyroscope according to claim 1, further comprising:
a plurality of flexure supports with each flexure support of said plurality of flexure supports directly connecting to a respective central flexure of said plurality of central flexures, said each flexure support directly connecting to a respective pair of lateral flexures, said respective central flexure being located between said respective pair of lateral flexures.

8. A gyroscope according to claim 7, wherein:
each central flexure has two strips of said plurality of strips that are directly connected to said flexure support.

9. A gyroscope according to claim 8, further comprising:
a strip connector directly connected to said two strips of said plurality of strips of each central flexures that connect directly to said flexure support.

10. A gyroscope according to claim 9, wherein:
said plurality of strips of each central flexure includes two additional strips that connect directly to said flexure support.

11. A gyroscope according to claim 9, wherein:
said proof mass has at least one pair of promontory regions with each respective promontory region of said at least one pair of promontory regions directly connecting to a corresponding respective lateral isthmus.

12. A gyroscope according to claim 11, wherein said plurality of strips of said plurality of central flexures includes at least one strip that connects directly to said strip connector, said at least one strip directly connecting to said corresponding respective lateral isthmus as well.

13. A gyroscope according to claim 12, wherein:
said plurality of lateral strips of each lateral flexure are all directly connected to a respective orthoganol connector.

14. A gyroscope according to claim 13, wherein:
said flexure support includes a lateral region directly connecting to an arm region of said flexure support through a connecting region;
said lateral region of said flexure support includes an isthmus that directly connects to a distinct strip of said plurality of lateral strips; and said arm region of said flexure support includes another isthmus that directly connects to another strip of said plurality of lateral strips.

15. A SOI-MEMS gyroscope, comprising:
a proof mass;
a flexure support;
an actuator element connecting to said flexure support;
a strip connector;
a central flexure that includes said strip connector and a plurality of strips that are directly connected to said strip connector, at least one of said plurality of strips being directly connected to said flexure support and at least one strip of said plurality of strips being connected to the proof mass at a lateral isthmus location;
a lateral flexure having a plurality of lateral strips with one strip of said plurality of strips being directly connected to a lateral region of said flexure support by an isthmus and another strip of said plurality of lateral strips connecting to an arm of said flexure support by another isthmus.

16. The gyroscope of claim 15, wherein:
The actuator element is a row of a comb-finger actuator.

17. The gyroscope of claim 15, further comprising:
an anchor directly connected to two lateral strips of said plurality of lateral strips, said two lateral strips being directly connected to said anchor and being separated by a narrow channel said anchor directly connecting to an underlying silicon substrate.

18. The gyroscope of claim 15, wherein:
said gyroscope is three-fold symmetrical in that said gyroscope is symmetrical in x, in y and diagonally.

19. A gyroscope device, comprising:
a substrate surface (70);
a proof mass (52);
a plurality of central flexures (60) connecting to said proof mass, at least a portion of each central flexure of said plurality of central flexures being positioned between respective first and second promontory regions (112A, 112B) of said proof mass in one direction, and being positioned between an interior border (91) of said proof mass and a flexure support rotor (78) in another direction; each of said plurality of central flexures having a truss (100) that is separated from said interior border by a predetermined distance, said each central flexure further including a plurality of flexure strips which are directly connected to said truss, a first flexure strip (104) of said plurality of flexure strips connects said truss (100) to said first promontory region (112A) of said proof mass and a second flexure strip (108) connects said truss to said second promontory region (112B) of said proof mass, and a third flexure strip (102) directly connects said truss (100) and said flexure support rotor (78).

20. A gyroscope device according to claim 19, wherein:
said each central flexure further comprises a fourth flexure strip (106) directly connecting said truss (100) to said flexure support rotor (78).

21. A gyroscope device according to claim 20, further comprising:
a lateral flexure (62A) connected to said flexure support rotor (78); said flexure support rotor having a lateral region (83) and a support arm (72), said lateral flexure having a first lateral strip (94) and a second lateral strip (96), said first lateral strip being directly connected to an orthoganol truss (99) and to said arm region (72) of said flexure support rotor (78), said second lateral strip (96) being directly connected to said orthoganol truss (99) and to said lateral region (83) of said flexure support rotor (78), said first lateral strip making direct contact with said arm region at an isthmus strip location (74) and said second lateral strip making direct contact with said lateral region (83) at a second isthmus strip location (76), said first and second isthmus strip locations being the only locations where said lateral flexure makes direct contact with said flexure support rotor (78).

22. A gyroscope device according to claim 21, wherein:
a first lateral isthmus (69A) directly connects said first flexure strip (104) to said first promontory region (112A) and a second lateral isthmus (69B) directly connects said second flexure strip (108) to said second promontory region (112B).

23. A gyroscope device according to claim 21, wherein:
said lateral flexure further comprises a first narrow strip (88) and a second narrow strip (92) that are both directly connected to said orthoganol truss (99).

24. A gyroscope device according to claim 23, wherein:
a narrow channel (90) separates said first narrow strip and said second narrow strip, said first narrow strip and said second narrow strip connecting to an anchor that connects to said substrate surface.

25. A gyroscope device according to claim 24, wherein:
said proof mass measures 1770 μm across.

26. A gyroscope according to claim 24, wherein:
said proof mass has a side border region (110A) in parallel with at least a portion of said support arm of said flexure support rotor.

27. A gyroscope device according to claim 19, further comprising:
a lateral flexure (62A) connected to said flexure support rotor (78); said flexure support rotor having a lateral region (83) and a support arm (72), said lateral flexure having a first lateral strip (94) and a second lateral strip (96), said first lateral strip being directly connected to an orthoganol truss (99) and to said support arm (72) of said flexure support rotor (78), said second lateral strip (96) being directly connected to said orthoganol truss (99) and to said lateral region (83) of said flexure support rotor (78), said first lateral strip making direct contact with said arm region at an isthmus strip location (74) and said second lateral strip making direct contact with said lateral region (83) at a second isthmus strip location (76), said first and second isthmus strip locations being the only locations where said lateral flexure makes direct contact with said flexure support rotor (78).

28. A gyroscope device according to claim 19, wherein:
a first lateral isthmus (69A) directly connects said first flexure strip (104) to said first promontory region (112A) and a second lateral isthmus (69B) directly connects said second flexure strip (108) to said second promontory region (112B).

* * * * *